Figure 1:
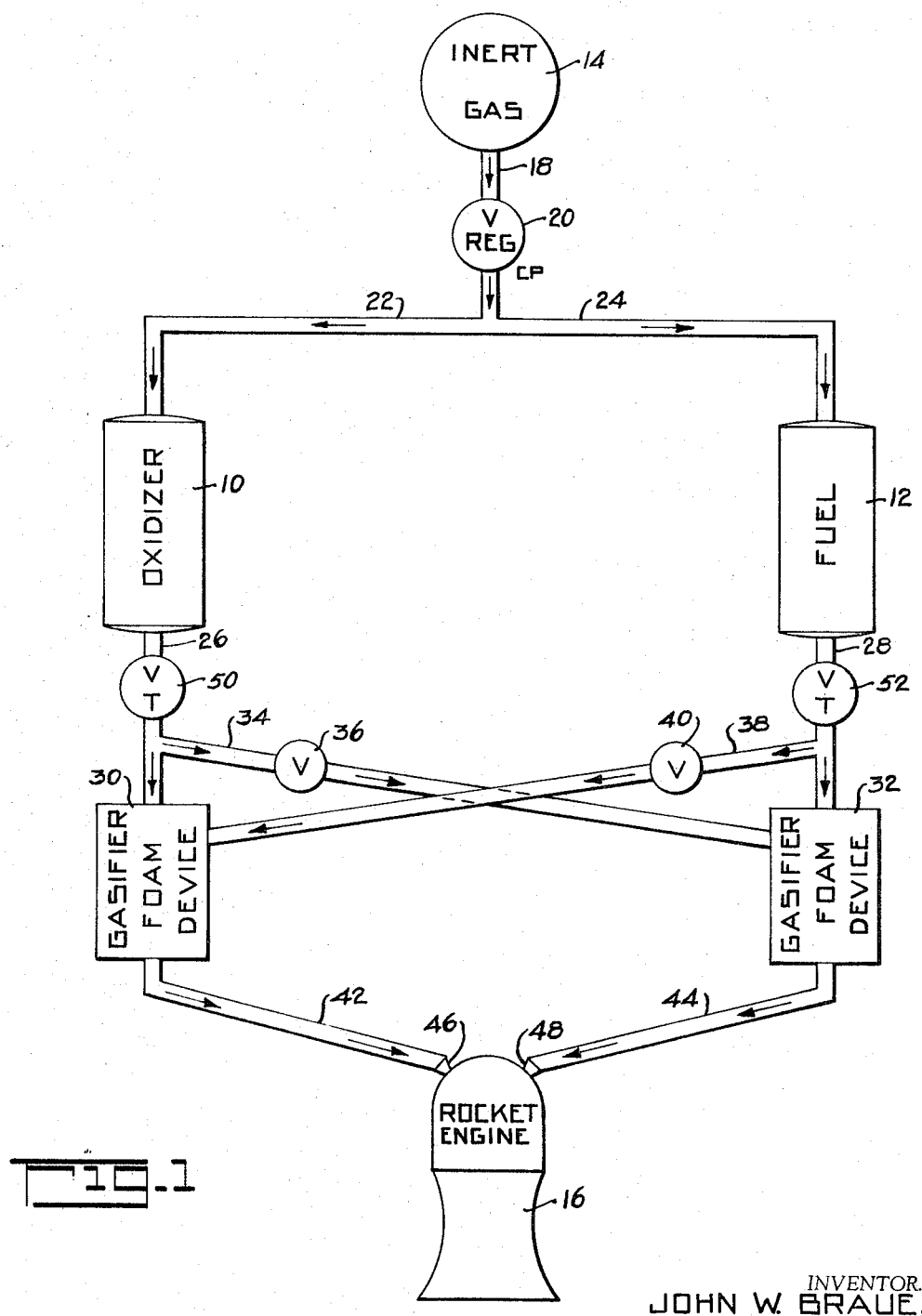

INVENTOR.
JOHN W. BRAUE, JR
BY
ATTORNEY

United States Patent Office 3,302,406
Patented Feb. 7, 1967

3,302,406
ROCKET ENGINE THROTTLING MEANS
John W. Braue, Jr., Emerson, N.J., assignor to Curtiss-Wright Corporation, a corporation of Delaware
Filed Oct. 14, 1963, Ser. No. 315,855
2 Claims. (Cl. 60—257)

This invention relates to a controllable thrust liquid propellant rocket engine and more particularly to a system and method controlling thrust by varying the density of the liquid propellant.

Liquid propellant rockets, largely in use today, are normally of the bi-propellant type wherein a hypergolic fuel-oxidizer combination is preferred because no ignition means is required in this case. In such a system, the fuel and oxidizer are stored in separate tanks within the vehicle and during engine operation are separately injected into the combustion chamber where upon contact, a hypergolic reaction takes place and the fuel and oxidizer are burned to form a large volume of gas which discharges out through the rocket nozzle. Some forms of liquid rocket engines of the bi-propellant type, however, do make use of ignition means to ignite the propellants and the present invention is applicable to either type.

As explained in co-pending application Ser. No. 295,670, filed July 17, 1963, now Patent No. 3,266,236, and assigned to the same assignee as the present application, it has been known that the thrust of a rocket engine may be controlled by varying the propellant weight flow through the injector by varying the pressure upstream of said injector as by a throttle means. Although this system is effective for small flow throttling ranges, such as 3:1, for larger flow throttling ranges the propellant tank pressures and weights are excessive and controlling the rocket thrust by this method becomes impractical, as will be pointed out more clearly hereinafter.

According to the present invention, throttling ranges in excess of 15:1 may be obtained without any substantial increase in propellant tank pressures and weights. The invention is generally carried out by introducing small amounts of a hypergolic agent into the liquid propellant main flow stream wherein such small amounts of hypergolic agent combine with the liquid propellant to produce combustion and thereby form gases which are mixed with the main stream of liquid propellant flow and decrease the density of said liquid propellant in proportion to the amount of hypergolic agent introduced therein. Producing a gaseous mixture in a liquid propellant stream to vary the density thereof is generally termed "foaming" and as used in this application may be defined as the homogeneous distribution of a gas within a fluid thereby producing a resultant fluid of desired reduced density. The introduction of the hypergolic agent may be controlled through a metering valve system which may be operated automatically or by manual control, as in the case of a piloted aircraft. It will be apparent that the density of the propellants will be reduced in accordance with the proportion of hypergolic agent introduced therein and as a result the thrust produced by the rocket engine will be accordingly varied in proportion to the changes in density of the liquid propellant.

Accordingly, it is one object of the invention to provide a novel and improved means for controlling the thrust produced by a liquid propellant rocket engine.

Another object of the invention is to provide a novel and improved means for reducing the density of the propellants injected into a rocket engine combustion chamber for varying the thrust produced by said rocket engine.

A further object of the invention is to provide a novel and improved means for producing a gaseous mixture for injection into the liquid propellant stream whereby the density of the propellant is reduced in proportion to the amount of gaseous mixture produced.

A still further object of the invention is to provide a novel and improved system and method for reducing the density of the propellants in a liquid propellant rocket engine whereby substantially large throttle ranges of thrust may be obtained without significant increases in propellant tank pressures and weights.

An additional object of the invention is to provide a novel and improved system and method for reducing the density of a liquid propellant for a liquid propellant rocket engine by introducing controlled amounts of a hypergolic agent into the propellant flow stream and thereby producing a gaseous mixture which reduces the density of the liquid propellant in accordance with the controlled amount of hypergolic agent introduced therein.

Figure 2:
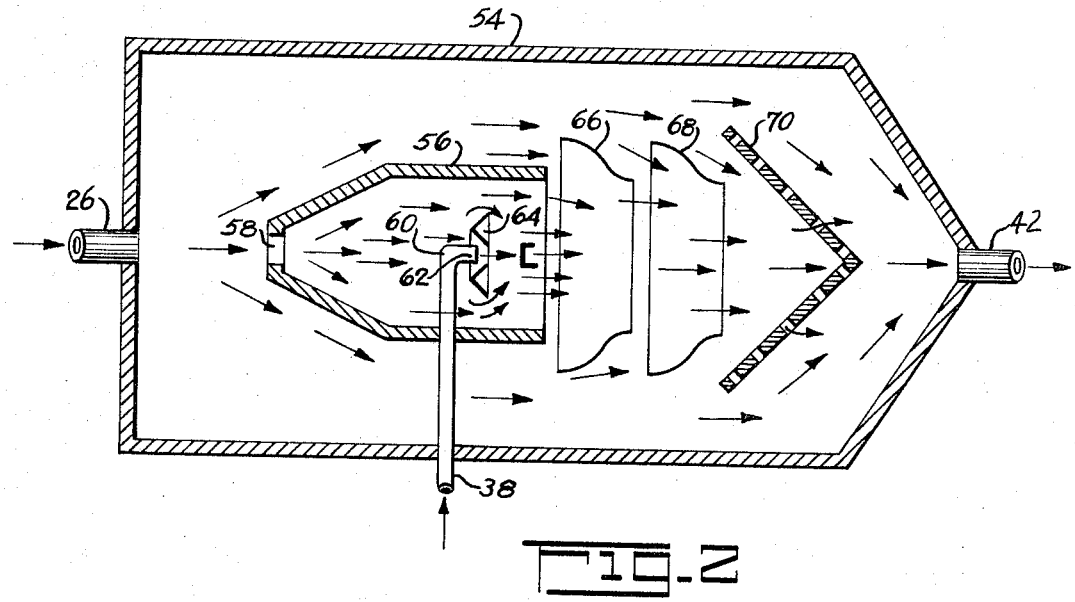

Additional objects and advantages of the invention will be best understood when reading the following detailed description with the accompanying drawings wherein:

FIG. 1 is a schematic view of a propulsion system for a liquid fuel rocket embodying the invention; and FIG. 2 is a partial sectional view showing one of the gasifier foam devices used in the arrangement of FIG. 1.

It is known in the field of liquid propellant rocket engines that the thrust produced by a rocket engine may be controlled through variation of the upstream pressure of the propellants before injection into the combustion chamber. However, in such systems, when the range between minimum and maximum thrust level is increased the propellant tank pressures and weight also proportionately increase so as to become impractical for relatively large variations in thrust control. It is possible, by known methods, to calculate for a particular geometry rocket engine, the combustion chamber pressures, the pressure drop across the injector, the propellant tank pressures and the required propellant tank weights for the said tank pressures for any desired thrust level. For example, in the case of a 1500 lb. thrust engine operating at a combustion chamber pressure of 250 p.s.i.a. and a system total impulse of one million lb.-seconds, it has been found that, when operating this rocket engine at a 15:1 throttling range, the required tank pressure would be approximately 1400 p.s.i.a. and an additional tankage weight of approximately 550 lbs. would be required over that required for the same rocket engine operating at fixed flow conditions. It will be apparent therefore, that, when using injector upstream pressure as the throttling means, as the throttling range of the rocket engine is increased, the weight penalties due to the required increase in tank pressures become excessive so as to make this method of varying the thrust impractical for relatively wide ranges of thrust variation as, for example, beyond 15:1. Reference may be made to co-pending application Ser. No. 295,670, filed July 17, 1963, and assigned to the same assignee as the present application, for a more detailed description of the drawback of prior art systems for varying the thrust of a rocket engine while using upstream pressure as the throttling means.

The major factor in controlling the thrust of a rocket engine is the control of the weight flow of the propellant through the injector nozzle into the combustion chamber. Basically, the weight flow of a liquid passing through the fixed orifice of an injector nozzle is proportional to the product of the density of the liquid and the pressure drop across the injector nozzle. If the fluid density can be reduced by entraining a gas in the fluid stream ahead of the injector nozzle, the mass flow will be reduced in proportion to the square root of the ratio of the density. This characteristic of fluid flow permits a wide range of weight flow rate with little or no change in pressure drop across the orifice. Since a homogeneous disposition of gas within the liquid is desired, the resultant mixture is termed a foam.

A system and method of foaming propellant for varying the weight flow of the propellant through the injector has been suggested wherein the propellants are fed under a high and substantially constant pressure into a foaming device wherein the propellants are foamed with various amounts of gas. This method requires a variable control for regulating the flow of gas into the propellants. In order to insure a proper mixture of the gas and the liquid for wide ranges of thrust, the pressure of the gas must be correspondingly increased with increases in the throttling range. Since it is well known that tankage weight for gases stored under high pressure is heavier than liquid tankage on a unit volume basis, systems which require substantially large amounts of foaming gas stored under pressure are subject to weight penalties as was the case of the prior systems mentioned above. It is apparent that in this gas foaming method the gas pressure must be maintained higher than the propellant pressure in order that the gas can be fed into the liquid propellant. For high throttling ranges, wherein the tank pressures must be increased, the tank pressures for the gas and the tank weights must be increased to a point wherein these values become excessive. It can be seen therefore, that this method is limited as to the range of throttling that can be employed. A system and method of foaming the propellants similar to that described above is disclosed in U.S. Patent No. 3,054,424, issued on July 24, 1962.

It will be apparent from the following description of the present invention that a system and method for controlling the throttle of a liquid propellant rocket over relatively large throttle ranges is provided which uses upstream pressure variation while suffering substantially no weight penalty. The invention is best understood by referring to the drawings where in FIG. 1 there is schematically shown a propulsion system embodying the present invention. As shown in said figure, tanks 10 and 12 are provided for storing an oxidizer and fuel supply preferably being of the hypergolic type. For example, one suitable type of oxidizer and fuel supply may be nitrogen tetroxide ($N_2O_4$) and 50% hydrazine, 50% unsymmetrical dimethylhydrazine (UDMH). A tank 14 containing an inert gas, such as helium, etc., under pressure is provided for forcing the propellants from tanks 10 and 12 in order to supply said propellants to the rocket engine 16. The tank 14 is connected to said tanks 10 and 12 through a line 18 leading from said tank 14, which has positioned therein a pressure regulator valve 20 for maintaining the gas from tank 14 at a substantially constant pressure, and said line 18 is divided into two feed lines 22 and 24 leading to the oxidizer tank 10 and the fuel supply tank 12, respectively. Lines 26 and 28 are provided for transmitting the propellants from the tanks 10 and 12, respectively, to gasifier foam devices 30 and 32 positioned in the lines 26 and 28, as illustrated.

As further illustrated in FIG. 1, a line 34 is connected to the propellant line 26 at one end thereof and to the gasifier foam device 32 at its other end. A valve 36 is positioned intermediately at the ends of line 34 with said valve 36 being adjustable for regulating the flow of propellant from line 26 to thte foaming device 32. A line 38 is also provided and is connected to the line 28 from the fuel tank 12 and to the gasifier foam device 30 for supplying fuel from said fuel tank 12 to the foaming device 30. Like the line 34, the line 38 also has a regulator valve 40 positioned intermediate its ends for regulating the flow of fuel from the line 28 to said foaming device 30. The valves 36 and 40 may be controlled by a well-known means such as, an automatic signal from a computer or the like or by manual means controlled by a pilot when the invention is embodied in a piloted aircraft. Lines 42 and 44 are respectively provided to transmit the propellants from the gasifier foam devices 30 and 32 to respective injector nozzle means 46 and 48 for injection into the rocket engine wherein the propellants will ignite to provide thrust.

Variable throttle means 50 and 52 are provided in the propellant lines 26 and 28, respectively, with the throttle valve means 50 and 52 being positioned downstream of the tanks 10 and 12 but upstream of their associated foaming devices 30 and 32. The variable throttle valves 50 and 52 serve to vary the pressure of the propellant in their respective lines 26 and 28 in response to thrust demands and may be suitably controlled in the same manner as the regulator valves 36 and 40, as was discussed above. As is apparent in FIG. 1, the throttle valves 50 and 52 are positioned upstream of the rocket engine 16 and more particularly upstream of the rocket engine injectors 46 and 48, so that it may be said that the pressure of the propellants may be varied upstream from said injectors or further, upstream of the foaming devices 30 and 32.

Referring now to FIG. 2 wherein there is shown a partial sectional view of one of the gasifier foam devices which may be used in the present invention, the foaming device illustrated therein comprises an outer wall 54 which forms a hollow casing of the foaming device and to which is connected at one end a propellant line 26 in the case of the foaming device 30 and at its other end the propellant line 42. Suitably supported within the hollow foaming device 30 is a hollow, substantially cylindrical member 56 having an opening 58 in one end thereof for receiving a portion of the flow of liquid propellant supplied to the foaming device through the line 26. As further illustrated, the cross-feed line 38 from fuel line 28 passes through the wall 54 of the hollow foaming device 30 and into the hollow space of the hollow member 56 at substantially the center portion thereof. The line 38 has an elbow portion 60 thereon adjacent its end within the hollow member 56 with the opening 62 thereof facing in the direction of the propellant flow. Positioned adjacent the outlet opening 62 of the line 38 is a vortex generator 64 which comprises a ring member having a triangular cross section. The vortex generator 64 has the triangular portion thereof facing the oncoming flow of propellant so that as the propellant flows over the surface of said vortex generator the velocity thereof will be decreased on the opposite side of the vortex generator. Such devices as the vortex generator 64 are well known in the art and are commonly used as flame holders in jet engines or the like, as is the purpose here, which will be explained more clearly hereinafter.

As was stated above, the propellants are preferably hypergolic. It will therefore be apparent that the oxidizer supplied through the line 26 and the fuel supplied through the line 38 will combine in a hypergolic reaction on one side of the vortex generator 64 designated by C, which may be termed the combustion zone. The resultant reaction of the hypergolic propellants in the combustion zone C will generate a finite amount of high temperature gas in proportion to the amount or ratio of the hypergolic propellants introduced into said zone. The gases or combustion products, when disbursed into the remainder of the propellant stream from the line 26, will effectively reduce the mean density of the stream, thereby providing a reduced mass flow of propellant into the thrust chamber of the rocket engine, while still maintaining a favorable injection velocity.

Annular baffle rings 66 and 68 may also be provided for diverting the gas and propellant mixture from the hollow member 56 and the remainder of the propellant flow from the line 26 into a perforated cone member 70 which consists of a cone member formed of a suitable material and having a plurality of small holes formed therein. The perforated cone member 70 serves to induce dispersion of the gas into the entire liquid stream thereby further foaming the propellant. In other words, the perforated cone member 70 will break up any large concentration of gas bubbles into smaller gas bubbles for dispersion throughout the liquid propellant stream. The foam mixture will then be transmitted by line 42 into the injector 46 for injection into the combustion chamber of the rocket engine 16 which will produce thrust in accordance with the weight flow of the propellant introduced through said injector 46. It should of course be understood that the gasifier foam device 32 operates in a similar manner for supplying a foamed propellant mixture through the line 44 to the injector 48. The gasifier foam device 30 illustrated in FIG. 2 is only exemplary of a means for generating a gas through combustion of small amounts of the hypergolic propellants and the invention is not to be limited to the specific device shown therein. It should also be understood that an ignition means may be provided in each of the gasifier foam devices 30 and 32 for use with non-hypergolic propellants. The invention also is intended to encompass the use of solid as well as liquid propellants or combinations thereof for generating the foaming gas.

The operation of the present invention is substantially as follows:

The propellants in tanks 10 and 12 are pressurized by the inert gas in tank 14 by a substantially constant pressure force regulated by the valve 20 wherein the propellants will be forced out of said tanks 10 and 12 into lines 26 and 28, respectively. At maximum thrust demand, the variable throttle valve 50 and 52 will be at their maximum opened positions to allow a maximum pressure flow while the valves 36 and 40 will be closed to prevent any cross flow of the propellants into the respective foaming devices 30 and 32. Therefore, the weight flow of the propellants into the combustion chamber of the rocket engine 16 will be at a maximum for producing maximum thrust output of said rocket engine 16. When it is desired to reduce the thrust output of the rocket engine 16, the throttle valves 50 and 52 are regulated so as to reduce the pressure in the propellant streams 26 and 28. At the same time the regulator valves 36 and 40 are opened an amount in accordance with the thrust level desired to permit a cross feed of oxidizer or propellant from the line 26 into the foaming device 32 and the fuel line or propellant line 28, and a cross feed from the propellant line 28 into the foaming device 30 and the propellant line 26. As was explained above, the reaction of the cross feed propellants in the foaming devices 30 and 32 will result in a small amount of combustion in said devices to produce a gas which is disbursed into the respective fluid streams 26 and 28. The gas and propellant mixture or foam will thereby be of a lesser density than the pure propellants introduced into the foaming devices 30 and 32 and the injection of the foamed propellants into the rocket engine 16 will result in a reduced thrust level output due to the reduction in weight flow of the propellants through the injectors 46 and 48. The thrust level can be further reduced by increasing the controlled amount of cross feeding of the propellants to thereby further decrease the density of each of the propellants with a resulting decrease in weight flow of the propellants through the injectors. It will be seen therefore, that the amount of foaming of the liquid propellant and the resultant density thereof is controlled primarily through the amount of cross feeding through the lines 34 and 38 and valves 36 and 40, respectively. It will further be apparent that the invention may be practiced even in absence of the throttle valves 50 and 52 since the resultant density of the propellants may be controlled solely by controlling the amount of fuel introduced into the oxidizer stream and oxidizer introduced into the fuel stream.

It should be particularly noted that the foaming of the propellants in the present invention is carried out in complete absence of the requirement of a separate gas supply to produce foaming as is required in the prior art foaming systems such as disclosed in the prior mentioned patent. Therefore, there will be a savings in the elimination of the weight of the foaming gas, the tankage and support structure, and the gas delivery system, all of which were required in the prior art system. Also, employing the basic engine propellants as the gas generation medium eliminates the logistic problem of supplying the gas medium itself. It should also be noted that the propellant energy released during the hypergolic reaction or combustion in the foaming devices is not lost but is utilized to raise the temperature of the liquid propellant prior to injection into the rocket engine combustion chamber. Therefore, the foaming devices require no special cooling means, even though combustion takes place therein due to the fact that the main propellant stream from the propellant supply lines serves to absorb the heat resulting from the combustion and thereby cool the walls of the foaming device. It can be seen therefore that the present invention provides a system and method for varying the thrust of a rocket engine over relatively wide thrust ranges with substantially no weight penalty added to the system. It has been found that due to the elimination of the weight penalty suffered by the prior art devices, throttling ranges of 30:1 or greater can be obtained.

While the invention has been described in detail in its preferred embodiment, it will be understood that the invention is not intended to be limited by said details and that changes and modifications may be made by those skilled in the art without departing from the spirit and scope of the invention. For example, the invention is not intended to be limited to the type of liquid propellants disclosed herein. It is intended that the invention be also applicable to systems using non-hypergolic propellants and monopropellent systems wherein gas generation for foaming the propellants may be brought about by introducing a separate agent which has a hypergolic relationship with these propellants. Further, the pressures required for operation of the invention will depend upon the size and thrust limits of the engine and may be accordingly varied without departing from the scope of said invention. I intend to cover all such modified forms in the appended claims.

I claim:

1. A propulsion system comprising in combination:
   (a) a rocket motor having a combustion chamber and an exhaust nozzle;
   (b) means for separately storing two propellant liquids which react hypergolically with each other upon combination;
   (c) a pair of passages each for supplying one of said propellant liquids under pressure into said combustion chamber wherein said propellant reacts hypergolically with the propellant liquid supplied by the other passage such that said rocket motor produces thrust which increases with increases in the weight flow of said propellants injected into said rocket motor combustion chamber;
   (d) foaming means positioned in each of said passage means upstream of said rocket motor for producing a homogeneous liquid-gas mixture of lesser density than said propellants, said foaming means comprising:
      (i) a casing member having upstream and downstream communication with said passage,
      (ii) an annular vortex generator coaxially disposed in said casing with a portion of said propellant flowing through said vortex generator and the remainder flowing therearound,
      (iii) nozzle means supplied from said other propellant passage means and positioned to discharge a hypergolic agent through said vortex generator into said propellant liquid to create gas bubbles therein downstream from said generator, and (iv) mixing means positioned in said casing downstream from said generator and including perforated means to break up said gas bubbles and mix them with said propellant liquid to produce a homogeneous foamed liquid-gas mixture of lesser density than said propellant liquid; and (e) adjustable valve means for supplying controlled amounts of said hypergolic agent to said nozzle in each of said passage means for reaction with said propellants for varying the density of said propellants in accordance with the relative amount of said hypergolic agent supplied to said foaming means so that the weight flow of said propellants injected into said rocket motor combustion chamber will be varied for controlling the thrust output of said rocket motor.

2. A foaming device for liquid hypergolic fuels, comprising in combination a generally cylindrical casing member having upstream and downstream ends, said upstream end having an aperture therethrough for entry of a first liquid fuel component and said downstream end having an aperture therethrough for discharge of foamed fuel, a cup-like member disposed within said casing approximately coaxial therewith and generally toward the upstream end thereof, said cup-like member having an open end disposed in the downstream direction and a generally closed end disposed in the upstream direction and having an aperture therethrough for first fuel component entry, an annular vortex generator disposed within said cup-like member generally coaxial therewith, passage means for a second liquid fuel component transpiercing said cup-like member and having a nozzle discharging in a downstream direction through said vortex generator, at least one generally frusto-conical annular mixing member disposed downstream from said vortex generator and generally coaxial therewith, and a perforated conical member disposed downstream from said mixing member with its apex in the downstream direction, whereby a first portion of said first fuel component entering said foaming device flows past said cup-like member with a second portion of said first fuel component flowing therethrough, said second fuel component discharged from said nozzle reacts with said second portion of said first fuel component to create gas bubbles therein which are mixed with said first portion on passing through said mixing member and broken into finer bubbles on passing through said perforated member to produce a homogeneous foamed liquid-gas mixture of lesser density than said first liquid fuel component.

References Cited by the Examiner
UNITED STATES PATENTS

| | | | |
|---|---|---|---|
| 3,128,601 | 4/1964 | Abild | 60—35.6 |
| 3,257,800 | 6/1966 | Lawrence et al. | 60—35.3 |

MARK NEWMAN, *Primary Examiner.*

D. HART, *Assistant Examiner.*